(12) United States Patent
Thiele et al.

(10) Patent No.: US 12,147,902 B2
(45) Date of Patent: Nov. 19, 2024

(54) BACKPROPAGATION OF ERRORS IN PULSED FORM IN A PULSED NEURAL NETWORK

(71) Applicant: COMMISSARIAT A L'ENERGIE ATOMIQUE ET AUX ENERGIES ALTERNATIVES, Paris (FR)

(72) Inventors: Johannes Thiele, Paris (FR); Olivier Bichler, Vieille Eglise en Yvelines (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 873 days.

(21) Appl. No.: 17/287,277

(22) PCT Filed: Oct. 22, 2019

(86) PCT No.: PCT/EP2019/078669
§ 371 (c)(1),
(2) Date: Apr. 21, 2021

(87) PCT Pub. No.: WO2020/083880
PCT Pub. Date: Apr. 30, 2020

(65) Prior Publication Data
US 2021/0397968 A1    Dec. 23, 2021

(30) Foreign Application Priority Data

Oct. 23, 2018 (FR) ....................................... 1859760

(51) Int. Cl.
*G06N 3/084*    (2023.01)
*G06N 3/048*    (2023.01)
(Continued)

(52) U.S. Cl.
CPC ............. *G06N 3/084* (2013.01); *G06N 3/048* (2023.01); *G06N 3/049* (2013.01); *G06N 3/065* (2023.01)

(58) Field of Classification Search
CPC ........ G06N 3/084; G06N 3/065; G06N 3/048; G06N 3/049
See application file for complete search history.

(56) References Cited

U.S. PATENT DOCUMENTS 9,489,623 B1 * 11/2016 Sinyavskiy ............ G06N 3/044
2015/0269485 A1    9/2015 Julian et al.
2017/0228646 A1    8/2017 O'Connor et al.

OTHER PUBLICATIONS

Yin, et al., "Algorithm and hardware design of discrete-time spiking neural networks based on back propagation with binary activations", IEEE Biomedical Circuits and Systems, 2017.
(Continued)

Primary Examiner — Kyle R Stork
(74) Attorney, Agent, or Firm — BakerHostetler (57) ABSTRACT

A new implementation is provided for an error back-propagation algorithm that is suited to the hardware constraints of a device implementing a spiking neural network. The invention notably uses binary or ternary encoding of the errors calculated in the back-propagation phase to adapt its implementation to the constraints of the network, and thus to avoid having to use floating-point number multiplication operators. More generally, the invention proposes a global adaptation of the back-propagation algorithm to the specific constraints of a spiking neural network. In particular, the invention makes it possible to use the same propagation infrastructure to propagate the data and to back-propagate the errors in the training phase. The invention proposes a generic implementation of a spiking neuron that is suitable for implementing any type of spiking neural network, in particular convolutional networks.

23 Claims, 7 Drawing Sheets

(51) Int. Cl.
*G06N 3/049* (2023.01)
*G06N 3/065* (2023.01)

(56) References Cited

OTHER PUBLICATIONS

O'Connor, et al., "Deep Spiking Networks", https://arxiv.org/pdf/1602.08323.pdf, XP055607120, 2016.
Mostafa et al, "Hardware efficient on line learning through pipelined truncated error back-propagation in binary state hetworks", H. Frontiers in Neuroscience, 2017.

* cited by examiner

BACKPROPAGATION OF ERRORS IN PULSED FORM IN A PULSED NEURAL NETWORK

CROSS-REFERENCE TO RELATED APPLICATIONS

This application is a National Stage of International patent application PCT/EP2019/078669, filed on Oct. 22, 2019, which claims priority to foreign French patent application No. FR 1859760, filed on Oct. 23, 2018, the disclosures of which are incorporated by reference in their entirety.

FIELD OF THE INVENTION

The invention relates to the field of artificial neural networks, and more precisely to that of spiking neural networks.

BACKGROUND

Artificial neural networks essentially consist of neurons that are interconnected to one another by synapses, which are conventionally implemented by digital memories, but which may also be implemented by resistive components whose conductance varies on the basis of the voltage applied to their terminals.

Spiking neural networks are generally optimized by implementing supervised or unsupervised learning methods.

These methods comprise a first phase of propagating data, produced at input of the neural network, to the output layer of the neural network, and then a second phase of back-propagating errors from the output layer to the input layer. In the second back-propagation phase, the synapses are updated based on errors calculated locally by each neuron on the basis of errors back-propagated from the previous layer of the neural network.

The invention relates to a spiking neuron and to a spiking neural network that are designed to implement an algorithm for back-propagating errors in the form of signed or unsigned spikes or binary or ternary data.

Spiking neural networks have the advantage of allowing implementation on computers with limited resources, since the processing operations implemented during the training propagation phase or during a classification phase do not require any floating-point number multiplications. Specifically, within a spiking neural network, the data are encoded in the form of (signed or unsigned) spikes, and the processing operations carried out by each neuron may therefore be implemented using only accumulators and comparators. The use of floating-point number multiplication operators is thus avoided, thereby exhibiting a certain advantage for a digital or analog implementation on devices with limited resources.

However, the back-propagation algorithm used to update the values of the synapses during a training phase for its part requires the use of floating-point number multiplications to calculate the errors local to each neuron. Moreover, it also requires synchronous propagation of these errors in the form of floating-point numbers between each layer of neurons of the neural network. However, spiking neural networks are based on a logic of propagating asynchronous data, in the form of spikes.

The back-propagation algorithm is thus generally not implemented, within a spiking neural network, in such a way as to take into account the hardware constraints of such a network.

Due to the incompatibility of implementing a back-propagation algorithm for a spiking neural network, training within such a network is generally performed using an algorithm inspired by "Spike-Timing Dependent Plasticity" or STDP biological rules. This type of training rule is however less efficient than training based on a back-propagation algorithm.

Scientific publication [1] describes one possible implementation of a back-propagation algorithm for a spiking neural network. However, this is an expensive implementation since it requires multiplications of floating-point numbers and is not suitable for devices with low consumption and limited resources.

Scientific publication [2] describes the possibility of quantizing, on three values, the errors back-propagated by the back-propagation algorithm. However, this document relates to formal neural networks and not spiking neural networks. It does not take into account the asynchronous processing constraints of these networks.

SUMMARY OF THE INVENTION

The invention proposes a new implementation of an error back-propagation algorithm that is suited to the hardware constraints of a device implementing a spiking neural network.

The invention notably uses binary or ternary encoding of the errors calculated in the back-propagation phase to adapt its implementation to the constraints of the network, and thus to avoid having to use floating-point number multiplication operators.

More generally, the invention proposes a global adaptation of the back-propagation algorithm to the specific constraints of a spiking neural network. In particular, the invention makes it possible to use the same propagation infrastructure to propagate the data and to back-propagate the errors in the training phase.

The invention proposes a generic implementation of a spiking neuron that is suitable for implementing any type of spiking neural network, in particular convolutional networks.

In a first embodiment, one subject of the invention is a spiking artificial neuron belonging to an intermediate layer of multiple neurons, the intermediate layer belonging to a neural network comprising multiple successive layers, the neural network being configured so as to execute a training mechanism comprising a first phase of propagating data from an input layer to an output layer, and a second phase of back-propagating errors from the output layer to the input layer, the spiking artificial neuron comprising, in order to execute the second back-propagation phase:

A first input/output interface capable of receiving binary or ternary error signals weighted by synaptic coefficients, An error calculation module configured so as to calculate a binary or ternary local error signal from a binary or ternary intermediate signal generated by the neuron in response to the received error signals and from an estimate of the derivative of an equivalent activation function implemented by the neuron during the first data propagation phase, A second input/output interface capable of propagating the binary or ternary local error signal to multiple synapses in the form of spikes.

According to one particular aspect of the first embodiment of the invention, the first input/output interface is capable of transmitting binary or ternary signals to multiple synapses in the form of spikes during the first data propagation phase, and the second input/output interface is capable of receiving binary or ternary signals weighted by synaptic coefficients during the first data propagation phase.

According to one particular variant of the first embodiment of the invention, the spiking artificial neuron comprises:
- An integration module for integrating said error signals in order to calculate a cumulative error,
- At least one comparator for comparing the cumulative error with at least one activation threshold from among a positive activation threshold and a negative activation threshold,
- An activation module configured so as to generate the binary or ternary intermediate signal on the basis of the result from the at least one comparator.

In a second embodiment, another subject of the invention is a spiking artificial neuron belonging to an intermediate layer of multiple neurons, the intermediate layer belonging to a neural network comprising multiple successive layers, the neural network being configured so as to execute a training mechanism comprising a first phase of propagating data from an input layer to an output layer, and a second phase of back-propagating errors from the output layer to the input layer, the spiking artificial neuron comprising, in order to execute the second back-propagation phase:
- A first input/output interface capable of receiving binary or ternary error signals,
- An error calculation module configured so as to calculate a binary or ternary local error signal from a binary or ternary intermediate signal generated by the neuron in response to the received error signals and from an estimate of the derivative of an equivalent activation function implemented by the neuron during the first data propagation phase,
- A second input/output interface capable of propagating the binary or ternary local error signal to the neurons of the following layer.

According to one particular aspect of the second embodiment of the invention, the first input/output interface is capable of transmitting binary or ternary signals to the neurons of the following layer during the first data propagation phase, and the second input/output interface is capable of receiving binary or ternary signals during the first data propagation phase.

According to one particular variant of the second embodiment of the invention, the spiking artificial neuron comprises:
- An integration module for integrating said binary or ternary error signals in order to calculate a cumulative error weighted by synaptic coefficients,
- At least one comparator for comparing the cumulative error with at least one activation threshold from among a positive activation threshold and a negative activation threshold,
- An activation module configured so as to generate the binary or ternary intermediate signal on the basis of the result from the at least one comparator.

According to one particular aspect of the invention, the activation module is configured so as to generate a positive intermediate signal when the cumulative error is greater than the positive activation threshold and a negative intermediate signal when the cumulative error is less than the negative activation threshold.

According to one particular variant, the spiking artificial neuron according to any one of the embodiments of the invention furthermore comprises a subtractor for subtracting the value of the positive activation threshold from the cumulative error when a positive intermediate signal is generated, and subtracting the value of the negative activation threshold from the cumulative error when a negative intermediate signal is generated.

According to one particular variant, the spiking artificial neuron according to any one of the embodiments of the invention furthermore comprises a module for calculating an update for synaptic coefficients from the local error and from a result of the equivalent activation function.

According to one particular aspect of the invention, the result of the equivalent activation function is calculated during the data propagation phase of a neuron.

According to one particular aspect of the invention, the module for calculating an update for synaptic coefficients is activated after the propagation of the local error.

According to one particular aspect of the invention, the module for calculating a local error signal is configured so as to calculate a product of the intermediate signal and the estimate of the derivative of the equivalent activation function.

According to one particular aspect of the invention, the equivalent activation function is a function of integrating the spikes generated by the neuron and that is weighted by a learning rate parameter of the neural network.

According to one particular variant, the spiking artificial neuron according to any one of the embodiments of the invention comprises a derivative calculation module configured so as to calculate the estimate of the derivative of the equivalent activation function from a result of the equivalent activation function implemented by the neuron during the first data propagation phase and from an integration variable of the neuron during the first data propagation phase.

According to one particular aspect of the invention, the estimate of the derivative of the equivalent activation function is equal to 1 when the result of said function is strictly positive or the integration variable is strictly positive, and is equal to 0 if not.

According to one particular aspect of the invention, the derivative calculation module is activated during the data propagation phase of the neuron or during the error back-propagation phase of the neuron.

A further subject of the invention is a spiking artificial neural network configured so as to execute a training mechanism comprising a first phase of propagating data from an input layer to an output layer, and a second phase of back-propagating errors from the output layer to the input layer, the neural network comprising multiple layers of spiking artificial neurons according to any one of the embodiments of the invention, each neuron being connected at least to a neuron of a following layer or to a neuron of a previous layer via a synapse.

According to one particular aspect of the invention, the network comprises an input layer and an output layer, the neurons of the input layer being configured so as to receive data to be propagated in binary or ternary form, and the neurons of the output layer being configured so as to calculate an error between an obtained result and a target result from the data propagated during the first data propagation phase.

According to one particular aspect of the invention, each neuron of the output layer comprises an encoder configured so as to encode the error into a set of at least one binary or ternary signal.

According to one particular aspect of the invention, the encoder is configured so as to quantize the error on two or three quantization levels so as to generate a binary or ternary signal.

According to one particular aspect of the invention, the encoder is configured so as to encode the error through a group of successive binary signals or a group of successive ternary signals.

A further subject of the invention is an artificial neural network configured so as to execute a training mechanism comprising a first phase of propagating data from an input layer to an output layer, and a second phase of back-propagating errors from the output layer to the input layer, the neural network comprising multiple layers of spiking artificial neurons according to the second embodiment of the invention, each neuron being connected at least to a neuron of a following layer or to a neuron of a previous layer via a synapse having a synaptic weight, the synapses being implemented in the form of digital memories, memristive devices or analog circuits.

According to one particular aspect of the invention, each synapse is configured so as to update its synaptic weight in response to a binary or ternary error signal received from a neuron of a following layer and to a signal representative of the result of the equivalent activation function received from a neuron of a previous layer.

BRIEF DESCRIPTION OF THE DRAWINGS

Other features and advantages of the present invention will become more clearly apparent upon reading the following description with reference to the appended drawings, in which.

DETAILED DESCRIPTION

Figure 1:
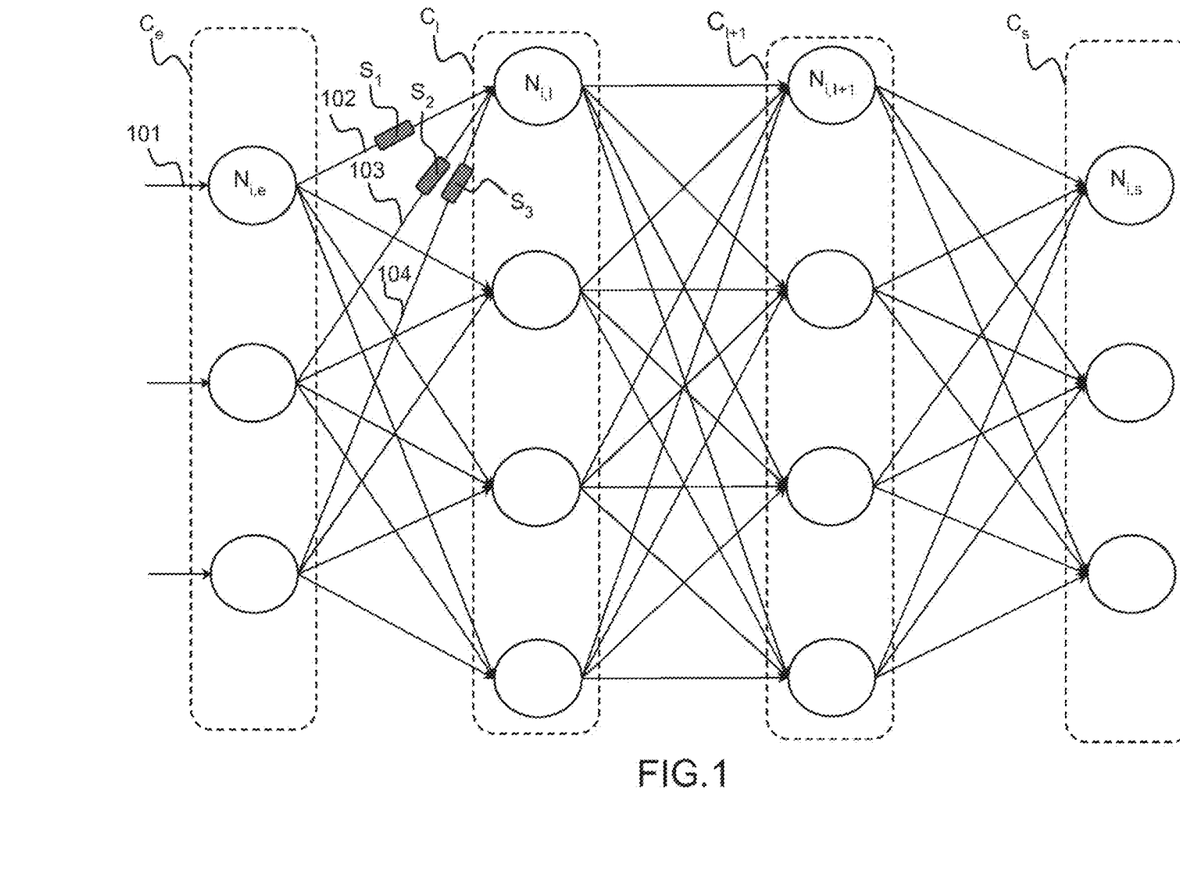
FIG. 1 shows a general diagram of a spiking artificial neural network.

FIG. 1 shows a general diagram of a spiking artificial neural network. A neural network conventionally consists of multiple layers $C_e$, $C_l$, $C_{l+1}$, $C_s$ of interconnected spiking neurons. The network comprises at least one input layer $C_e$ and one output layer $C_s$ and at least one intermediate layer $C_l$, $C_{l+1}$. The neurons $N_{i,e}$ of the input layer $C_e$ each receive an input datum 101 at input. The input data may be of different types depending on the targeted application. For example, they may be pixels of an image or audio or textual data, or more generally any type of data able to be encoded in the form of spikes. The applications of a neural network comprise in particular classifying and detecting objects in an image or in a video for devices embedded in autonomous vehicles or video surveillance devices associated with video surveillance cameras. A neural network is for example used in the field of image classification or image recognition, or more generally the recognition of features that may be visual, audio or both at the same time. Each neuron of a layer is connected, via its input and/or its output, to all of the neurons of the previous or following layer. More generally, a neuron might be connected to only some of the neurons of another layer, notably in the case of a convolutional network. The connections 102, 103, 104 between two neurons $N_{i,e}$, $N_{i,l}$ are made through artificial synapses $S_1$, $S_2$, $S_3$, which may be formed notably by digital memories or by memristive devices. The coefficients of the synapses may be optimized through a training mechanism for training the neural network. This mechanism comprises two separate phases: a first phase of propagating data from the input layer to the output layer, and a second phase of back-propagating errors from the output layer to the input layer, with the weights of the synapses being updated for each layer.

In the first data propagation phase, training data, for example images or sequences of images, are supplied at input to the neurons of the input layer and propagated in the network. For a spiking neural network, the data are encoded in the form of asynchronous spikes. The spikes correspond to binary or ternary signals; in other words they may be signed or unsigned spikes.

Each neuron, during this first phase, implements a function of integrating the spikes that it receives from the neurons of the previous layer (or the spikes encoded from the input data for the neurons of the input layer). The integration function consists essentially in accumulating the spikes weighted by the weights of the artificial synapses. Each neuron also implements an activation function that consists, based on a comparison of the integration variable with one or two activation threshold(s), in generating and propagating a spike to the neurons of the following layer. Depending on the chosen neuron models, the integration function and the activation function may vary. In particular, a leakage current may be implemented by the neuron in order to attenuate the integration variable over time when no spike is received by the neuron. The neurons $N_{i,s}$ of the output layer $C_s$ carry out additional processing in that they calculate an error between an integration result of the spikes received by the neuron $N_{i,s}$ and an expected value or a target value that corresponds to the final state of the neuron of the output layer that it is desired to obtain in relation to the training input data.

In the second error back-propagation phase, the neurons of the output layer $C_s$ transmit the calculated errors to the neurons of the previous layer $C_{l+1}$, which calculate a local error from the error back-propagated from the previous layer and in turn transmit this local error to the previous layer $C_l$. In parallel, each neuron calculates, from the local error, an update value for the weights of the synapses to which it is connected and updates the synapses. The process continues for each layer of neurons until the penultimate layer, which is responsible for updating the weights of the synapses that connect it to the input layer $C_e$.

One aim of the invention is to propose a specific implementation of the error back-propagation phase that is suited to the implementation constraints or to the hardware constraints of spiking neurons.

Figure 2:
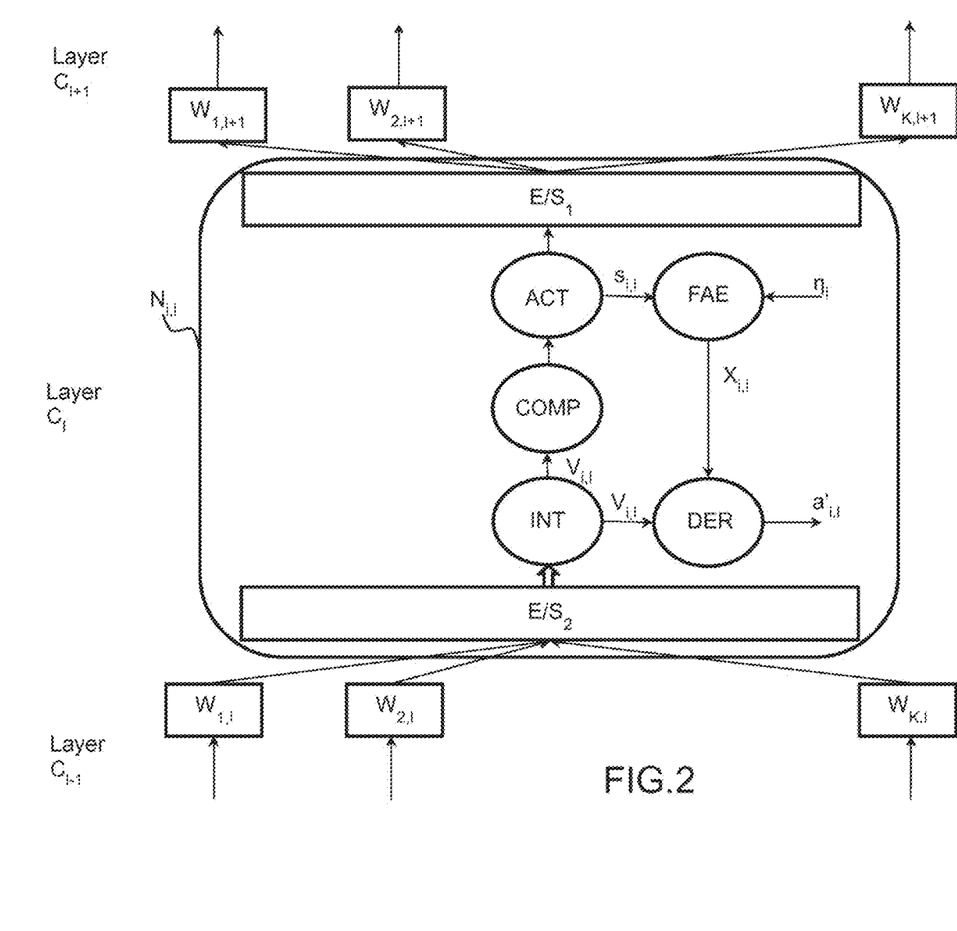
FIG. 2 shows a diagram of a spiking artificial neuron according to a first embodiment of the invention, carrying out a first data propagation phase of a training mechanism.

FIG. 2 describes one example of a spiking neuron according to a first embodiment of the invention and its operation in the data propagation phase.

FIG. 2 shows a neuron $N_{i,l}$ belonging to an intermediate layer $C_l$. The neuron $N_{i,l}$ is connected downstream to the neurons of a following layer $C_{l+1}$ via synapses $W_{1,l+1}$, $W_{2,l+1}, \ldots, W_{K,l+1}$. According to the first embodiment of the invention, the synapses are formed by memristive devices or memristors or any equivalent analog circuit. Likewise, the neuron $N_{i,l}$ is connected upstream to the neurons of a previous layer $C_{l-1}$ via synapses $W_{1,l}, W_{2,l}, \ldots, W_{K,l}$.

In the data propagation phase, the neuron $N_{i,l}$ receives, via a first input/output interface E/S$_2$, spikes transmitted by the neurons of the previous layer and weighted by the weights of the synapses $W_{1,l}, W_{2,l}, \ldots, W_{K,l}$. The synapses, formed by memristive devices, receive a signed or unsigned spike of constant amplitude transmitted by a neuron and transmit, at their output, a spike amplified by a value representative of the weight of the synapse. The signals received by the neuron $N_{i,l}$ correspond to binary or ternary signals weighted by the weights of the synapses. The received signals are integrated by an integration module INT that carries out an integration function that depends on the nature of the neuron. According to one exemplary embodiment, the integration function consists in summing or integrating over time the received signals. In another exemplary embodiment, the integration function comprises an attenuation or leakage function in order to reduce the integration variable over time when no signal is received by the neuron. The integration variable $V_{i,l}$ obtained at output of the integration module INT is then compared with one or more activation thresholds via a comparator COMP. According to a first exemplary embodiment, a single positive activation threshold $\theta_{ff}$ is used. When the integration variable $V_{i,l}$ exceeds the positive activation threshold $\theta_{ff}$, an activation module ACT generates a positive spike and the integration variable $V_{i,l}$ is reduced by the value of the threshold $\theta_{ff}$. According to a second exemplary embodiment, in addition to the positive threshold $\theta_{ff}$, a negative threshold $-\theta_{ff}$ is used. When the integration variable $V_{i,l}$ falls below the negative activation threshold $-\theta_{ff}$, an activation module ACT generates a negative spike and the integration variable $V_{i,l}$ is reduced by the value of the threshold $-\theta_{ff}$ (or increased by the value $\theta_{ff}$). The absolute values of the two thresholds may be equal or different. The spikes generated by the activation module ACT are transmitted to an input/output interface E/S$_1$ in order to be propagated to the synapses $W_{1,l+1}, W_{2,l+1}, \ldots, W_{K,l+1}$ connected between the neuron $N_{i,l}$ and the neurons of the following layer $C_{l+1}$.

The integration variable $V_{i,l}$ calculated by the integration module INT over time may be represented by the following relationship:

$$V_{i,l}(t)=V_{i,l}(t-\Delta t)-\theta_{ff} \cdot s_{i,l}(t-\Delta t)+\Sigma_j \omega_{i,j,l} \cdot s_{j,l-1}(t) \quad (1)$$

$s_{i,l}(t)$ represents the spike generated by the neuron whose value is given by the following relationship in the case of a ternary signal:

$$s_{i,l}(t) = s_{i,l}(V_{i,l}(t)) = \begin{cases} 1 & \text{if } V_{i,l}(t) > \theta_{ff} \\ -1 & \text{if } V_{i,l}(t) < -\theta_{ff} \\ 0 & \text{otherwise} \end{cases} \quad (2)$$

In the case of a binary signal, relationship (2) is replaced by:

$$s_{i,l}(t) = s_{i,l}(V_{i,l}(t)) = \begin{cases} 1 & \text{if } V_{i,l}(t) > \theta_{ff} \\ 0 & \text{otherwise} \end{cases} \quad (2')$$

The integration variable $V_{i,l}$ may be initialized to a value other than 0 at the start of the data propagation phase.

The processing operations described above and implemented by the neuron $N_{i,l}$ are based only on accumulations or comparisons, and do not require any multiplication of floating-point numbers.

The neuron $N_{i,l}$ additionally carries out two additional calculation functions in order to calculate variables that will be used during the error back-propagation phase.

A second integration module FAE is used to accumulate the spikes $s_{i,l}$ generated by the neuron over time, the accumulation being weighted by a learning rate $\eta_l$ that is a parameter of the neural network. This learning rate $\eta_l$ may be different for each layer of the network.

The variable $x_{i,l}$ obtained at output of this second integration module is represented by the following relationship:

$$x_{i,l}(t)=\eta_l \cdot s_{i,l}(t)+x_{i,l}(t-\Delta t) \quad (3)$$

This variable may also be represented by the following relationships, where $a_{i,l}$ corresponds to the accumulation over time of the spikes generated by the neuron and is called equivalent activation function of the neuron. The variable $x_{i,l}(t)$ corresponds to the equivalent activation function weighted by a learning rate parameter $\eta_l$.

$$x_{i,l}(t)=\eta_l \cdot a_{i,l}(t)$$

$$a_{i,l}(t)=s_{i,l}(t)+a_{i,l}(t-\Delta t)$$

Calculating the variable $x_{i,l}$ also does not require any multiplication since the spikes $s_{i,l}$ adopt the values 1, 0 or −1. Calculating the variable $x_{i,l}$ consists in accumulating the value $\eta_l$.

A differentiation module DER is also used to calculate an estimate $a'_{i,l}$ of the equivalent activation function $a_{i,l}$ of the neuron. This estimate is used in the error back-propagation phase.

The estimate $a'_{i,l}$ is equal to 1 if the integration variable $V_{i,l}$ is greater than 0 or the variable $x_{i,l}$ is greater than 0, and otherwise has the value 0.

$$a'_{i,l}(t) = \begin{cases} 1 & \text{if } V_{i,l}(t) > 0 \text{ ou } x_{i,l}(t) > 0 \\ 0 & \text{otherwise} \end{cases} \quad (4)$$

Without departing from the scope of the invention, other estimates $a'_{i,l}$ of the equivalent activation function may be determined so as to produce a binary variable {0; 1} or ternary variable {−1; 0; 1}. One feature of the invention is that the estimate $a'_{i,l}$ is a binary or ternary variable, so as to avoid calculations involving multiplications of floating-point numbers.

The values of $V_{i,l}(t)$ and $x_{i,l}(t)$ used to calculate $a'_{i,l}$ are the last up-to-date values calculated by the neuron in the data propagation phase for a training sequence presented at input of the neural network.

The estimate $a'_{i,l}$ of the equivalent activation function $a_{i,l}$ of the neuron may be calculated during the data propagation phase, in which case the value of $a'_{i,l}$ is saved in a memory in order to be used in the error back-propagation phase. The estimate $a'_{i,l}$ may also be calculated during the error back-propagation phase, from the last values of $V_{i,l}(t)$ and $x_{i,l}(t)$ saved by the neuron.

In one variant embodiment, the activation function implemented by the neuron may be modified as follows:

$$s_{i,l}(t) = s_{i,l}(V_{i,l}(t)) = \begin{cases} 1 & \text{if } V_{i,l}(t) > \theta_{ff} \\ -1 & \text{if } V_{i,l}(t) < -\theta_{ff} \text{ and } a_{i,l}(t) > 0 \\ 0 & \text{otherwise} \end{cases} \quad (5)$$

According to this variant, the sum of the spikes generated by the neuron, represented by the variable $a_{i,l}(t)$, is always greater than 0.

Figure 3:
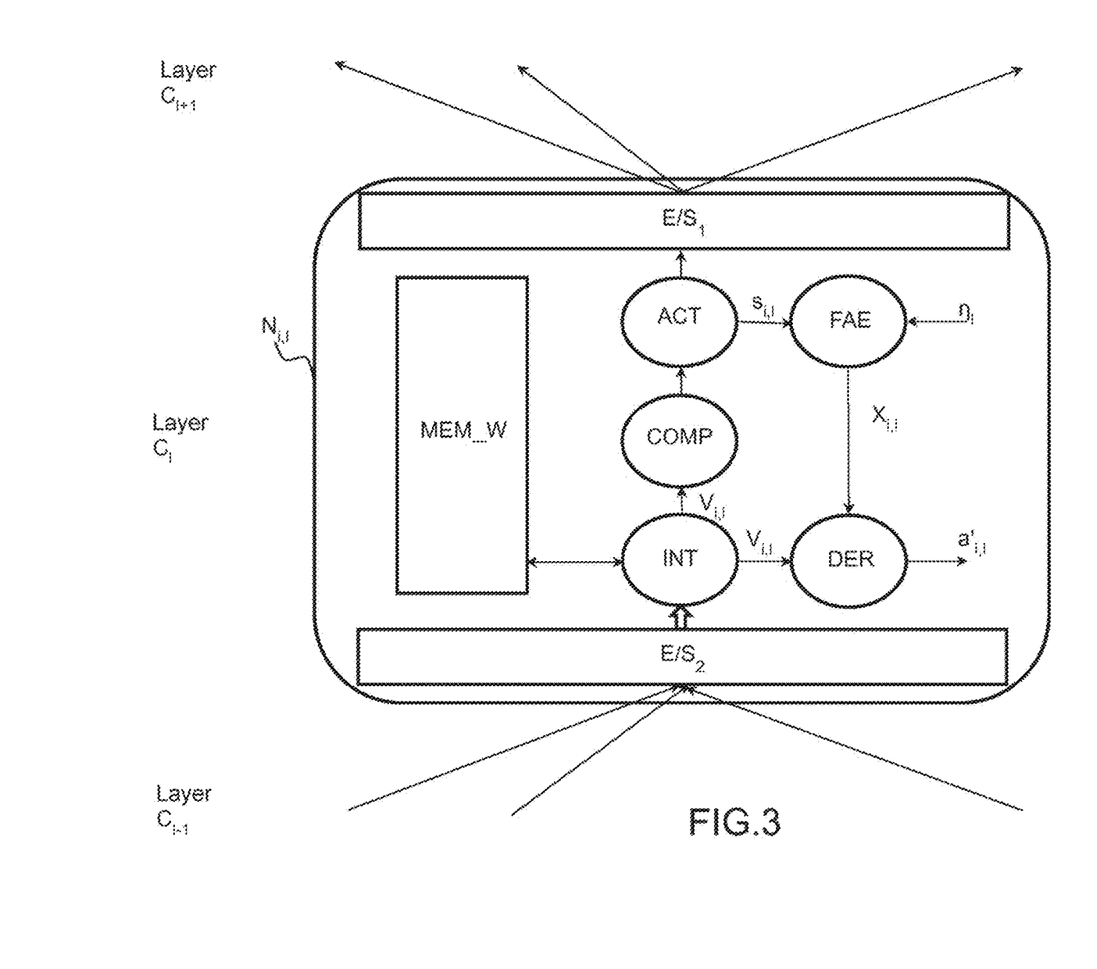
FIG. 3 shows a diagram of a spiking artificial neuron according to a second embodiment of the invention, carrying out a first data propagation phase of a training mechanism.

FIG. 3 shows a second embodiment of the spiking neuron according to the invention. In this second embodiment, the neuron is implemented by a digital device. The binary or ternary spike signals are encoded by binary or ternary digital signals and are transmitted between the neurons via a digital communication infrastructure. The synapses are no longer formed by active devices positioned on the connections between two neurons. According to this digital implementation, the weights of the synapses are stored in a digital memory MEM_W. The signals received by the input interface E/S$_2$ are binary or ternary signals (depending on the chosen neuron model). The integration module INT is modified so as to calculate the sum of the received signals weighted by the weights of the synapses that are read from the memory MEM_W. In other words, the weighting of the signals by the weights of the synapses is carried out by the neuron, and not by the synapses as in the first embodiment.

When the data produced at input of the neural network, in other words at input of the input layer C$_e$ of the network, are propagated to the output layer C$_s$ of the network, the data propagation phase is complete. Each neuron of the output layer is configured so as to calculate a variable and a desired target value for this variable. Depending on the chosen output neuron model, the variable that is used may be the integration variable $V_{i,s}$ calculated by the integration module INT or the spikes $s_{i,s}$ generated by the activation module ACT or the result of the equivalent activation function $a_{i,s}$ or any combination of one or more of these variables or other variables calculated by the output neuron. The target value is chosen according to the application. For example, if the neural network is used in the context of object classification, the target value corresponds to the object that each output neuron is supposed to detect.

In other words, each output neuron may calculate a cost function dependent on one or more of the calculated variables or a combination of one or more of these variables and a target value or desired value. The error calculated by the output neuron is then equal to the derivative of the cost function with respect to each variable that is used. For example, the cost function that is used may depend only on the equivalent activation function $a_{i,s}(t)$, and the calculated error will be dependent on the derivative of this equivalent activation function. $\delta_{i,s}$ denotes the error calculated by the output neuron N$_{i,s}$. This error is then encoded, using an encoder contained in the output neuron, in the form of spikes or digital data. Different types of encoding are possible. The spikes may be encoded on three levels in the form of ternary signals. According to a first variant, the error $\delta_{i,s}$, which is a floating-point number, is quantized on three levels −1, 0, 1 and transmitted to the neurons of the previous layer via a digital signal or a ternary spike. According to a second variant, the error $\delta_{i,s}$ is broken down into a sum of the values −1, 0 and 1 and is encoded by a group of digital data or ternary spikes. For example, the value 5.3 may be encoded by five successive positive spikes, and the value −3.2 may be encoded by three successive negative spikes. The spikes may also be encoded on two levels in the form of binary signals according to the two encoding variants presented above.

Figure 4:
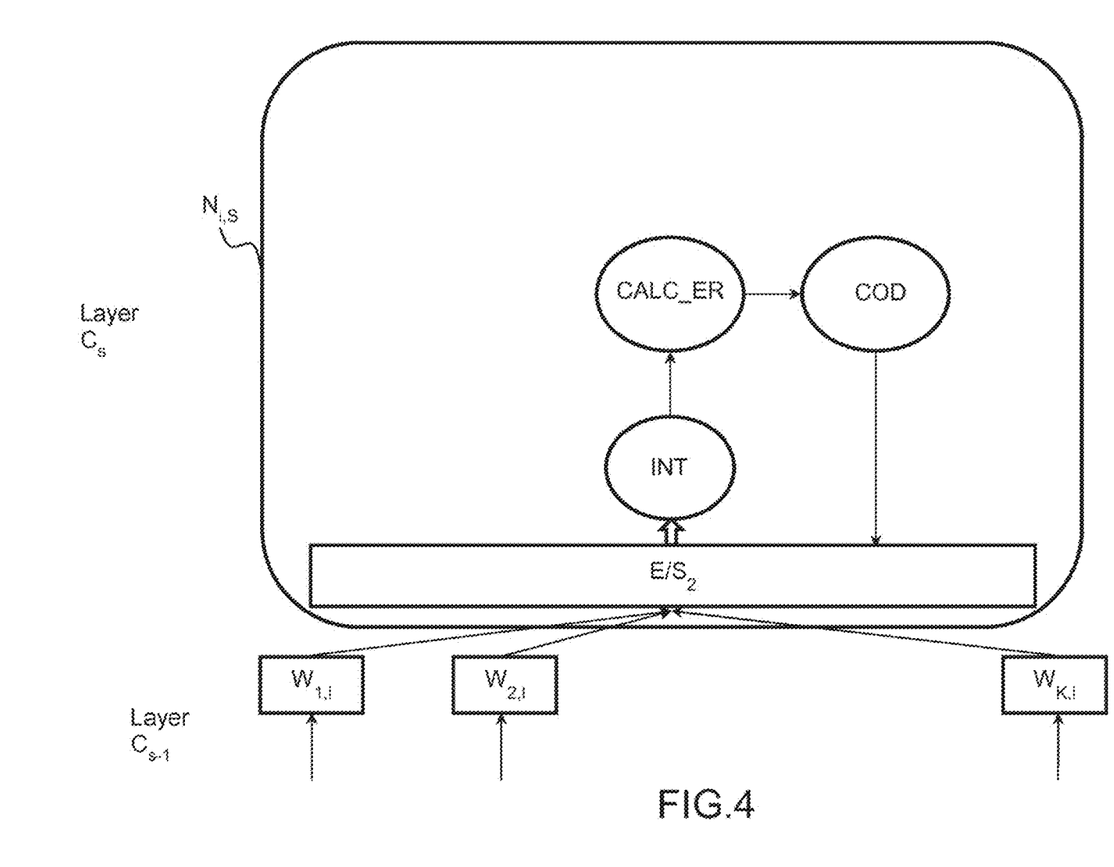
FIG. 4 shows a diagram of a spiking artificial neuron of the output layer of the neural network.

FIG. 4 shows one exemplary implementation of an output neuron N$_{i,s}$. This primarily comprises an input/output interface E/S$_2$, an integration module INT, an error calculation module CALC_ER and an encoder COD for encoding the calculated error into spikes that are then back-propagated to the previous layer via the input/output interface E/S$_2$. The output neuron N$_{i,s}$ may also comprise a comparator COMP and an activation module ACT when these are necessary to calculate variables used to calculate the error.

Figure 5:
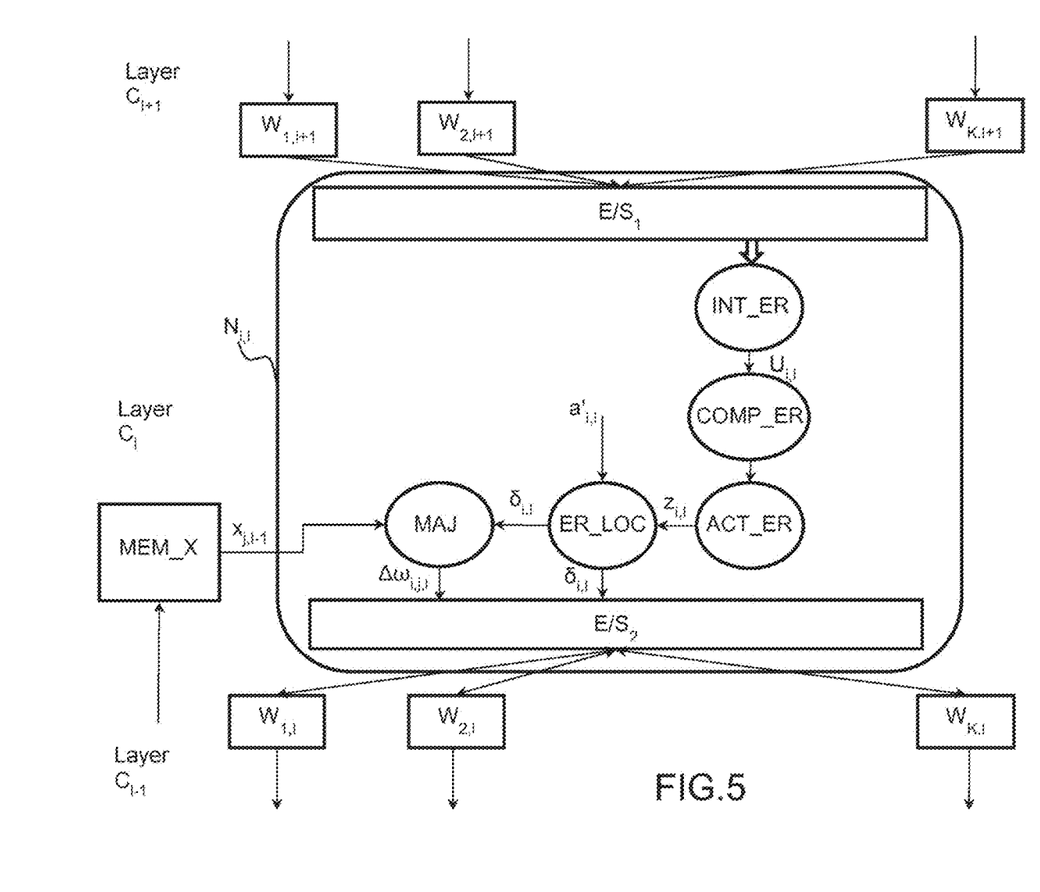
FIG. 5 shows a diagram of a spiking artificial neuron according to the first embodiment of the invention, carrying out a second error back-propagation phase of a training mechanism.

FIG. 5 describes, according to the first embodiment of the invention, the operation of a spiking neuron N$_{i,l}$ of an intermediate layer C$_l$ during the phase of back-propagating the errors calculated by the neurons of the output layer.

In this first embodiment, the synapses are formed by memristive devices, memristors or any equivalent analog circuit, as explained in the paragraph in relation to FIG. 2. FIG. 5 shows only the calculation modules and operators of the neuron that are involved during the back-propagation phase. In a real implementation of the neuron, this comprises both the modules and operators described in FIG. 5 that are activated during the back-propagation phase and the modules and operators described in FIG. 2 that are activated during the data back-propagation phase.

The synapses $W_{1,l+1}, W_{2,l+1}, \ldots, W_{K,l+1}$ receive the errors calculated by the neurons of the previous layer C$_{l+1}$ (in the back-propagation direction) in the form of binary or ternary spikes. Each synapse transmits, in response, a signal corresponding to the received spike weighted by the weight of the synapse. These weighted error signals are received by the input/output interface E/S$_1$ and then processed by an integration module INT_ER that accumulates the received signals. The integration module INT_ER activated during the back-propagation phase performs the same function as the integration module INT activated during the data propagation phase. They may be formed by two separate modules or by the same module. The integration variable $U_{i,l}$ obtained at output of the integration module INT_ER is then compared with one or two activation thresholds. For example, when the received signals are ternary signals, a positive activation threshold $\theta_{bp}$ and a negative activation threshold $-\theta_{bp}$ are used, via a comparator COMP_ER that may be formed by the same component as the comparator COMP described in FIG. 2. When the integration variable $U_{i,l}$ exceeds the positive activation threshold $\theta_{bp}$, an activation module ACT_ER generates a positive spike and the integration variable $U_{i,l}$ is reduced by the value of the threshold $\theta_{bp}$. When the integration variable $U_{i,l}$ falls below the negative activation threshold $-\theta_{bp}$, an activation module ACT_ER generates a negative spike and the integration variable $U_{i,l}$ is reduced by the value of the threshold $-\theta_{bp}$. The activation module ACT_ER may be formed by the same component as the activation module ACT described in FIG. 2.

The integration variable of the neuron during the error back-propagation phase is given by the following relationship:

$$U_{i,l}(t) = U_{i,l}(t-\Delta t) - \theta_{bp} \cdot z_{i,l}(t-\Delta t) + \Sigma_k \omega_{i,k,l+1} \cdot \delta_{k,l+1}(t)$$

The signal generated by the activation module ACT_ER is an intermediate spike signal $z_{i,l}$. It may be represented by the following relationship:

$$z_{i,l}(t) = \begin{cases} 1 & \text{if } U_{i,l}(t) > \theta_{bp} \\ -1 & \text{if } U_{i,l}(t) < -\theta_{bp} \\ 0 & \text{otherwise} \end{cases}$$

In one variant embodiment, the positive activation threshold may be replaced with $T+\theta_{bp}$ and the negative activation threshold may be replaced with $T-\theta_{bp}$, where T is a positive, negative or zero constant.

In another variant embodiment, the intermediate spike signal $z_{i,l}$ may be represented by the relationship:

$$z_{i,l}(t) = \begin{cases} 1 & \text{if } U_{i,l}(t) > \theta_{bp} \\ -1 & \text{if } U_{i,l}(t) < \theta_{bp} \\ 0 & \text{otherwise} \end{cases}$$

In this variant, a single threshold $\theta_{bp}$ is used instead of two thresholds. In this case, the integration variable $U_{i,l}$ is reduced by a predetermined value that may be equal to the threshold $\theta_{bp}$ or to a value different from the threshold $\theta_{bp}$.

According to another variant embodiment, when the received signals are binary signals, a single activation threshold $\theta_{bp}$ is used.

According to this variant embodiment, the intermediate spike signal $z_{i,l}$ may be represented by the following relationship:

$$z_{i,l}(t) = \begin{cases} 1 & \text{if } U_{i,l}(t) \geq \theta_{bp} \\ -1 & \text{if } U_{i,l}(t) < \theta_{bp} \end{cases}$$

Where $\theta_{bp}$ is an activation threshold whose value may be positive or negative. In this case, the integration variable $U_{i,l}$ is reduced by a predetermined value that may be equal to the threshold $\theta_{bp}$ or to a value different from the threshold $\theta_{bp}$.

In yet another variant embodiment in which the received signals are binary signals, the back-propagation algorithm executed by the neural network is implemented in two successive phases.

In a first phase, the back-propagation algorithm is executed by the neural network with consideration to a binary intermediate spike signal $z_{i,l}$ represented by the following relationship, where $\theta_{bp}$ is a positive activation threshold:

$$z_{i,l}(t) = \begin{cases} 1 & \text{if } U_{i,l}(t) > \theta_{bp} \\ 0 & \text{otherwise} \end{cases}$$

When the integration variable $U_{i,l}$ exceeds the activation threshold $\theta_{bp}$, the activation module ACT_ER generates a positive spike and the integration variable is reduced by the value of the threshold $\theta_{bp}$.

In a second phase, the back-propagation algorithm is executed by the neural network with consideration to a binary intermediate spike signal $z_{i,l}$ represented by the following relationship, where $-\theta_{bp}$ is a negative activation threshold:

$$z_{i,l}(t) = \begin{cases} -1 & \text{if } U_{i,l}(t) < -\theta_{bp} \\ 0 & \text{otherwise} \end{cases}$$

When the integration variable $U_{i,l}$ falls below the activation threshold $-\theta_{bp}$, the activation module ACT_ER generates a negative spike and the integration variable $U_{i,l}$ is reduced by the value of the threshold $-\theta_{bp}$ (or increased by the value of $\theta_{bp}$).

This signal is used to subsequently generate a local error in the same spike form. The local error is calculated by the calculating module ER_LOC from the intermediate signal $z_{i,l}$ and from the estimate $a'_{i,l}$ of the derivative of the equivalent activation function of the neuron. The estimate $a'_{i,l}$ was calculated by the neuron during the data propagation phase (see FIG. 2) or is calculated during the error back-propagation phase from the last values of the variables $x_{i,l}$ and $V_{i,l}$ that were saved at the end of the data propagation phase.

The local error is calculated by forming a product of the intermediate signal $z_{i,l}$ and of the estimate $a'_{i,l}$, which is a binary or ternary variable, depending on the selected model of the estimate $a'_{i,l}$.

$$\delta_{i,l}(t) = z_{i,l}(t) \cdot a'_{i,l}(t)$$

In one variant embodiment, a comparator is added so as not to perform this calculation when $a'_{i,l}(t)=0$;

Calculating the local error thus does not require a multiplication of floating-point numbers, and the result of this calculation is a ternary variable (which adopts the values 1, 0 or −1) or a binary variable.

The local error $\delta_{i,l}(t)$ is then propagated to the synapses of the following layer $C_{l-1}$ via the interface $E/S_2$.

The neuron also comprises a module MAJ for calculating an update for the weights of the synapses. This update is calculated from the local error and from the variable $x_{j,l-1}$ transmitted by each neuron of the layer $C_{l-1}$ to which the neuron $N_{i,l}$ is connected. The variable $x_{j,l-1}$ was calculated beforehand during the data propagation phase.

The update for the weights of a synapse $W_{j,l}$ is given by the relationship:

$$\Delta\omega_{i,j,l}(t) = -\delta_{i,l}(t) \cdot x_{j,l-1}(t)$$

These values are propagated to the synapses $W_{1,l}, W_{2,l}, \ldots W_{K,l}$ so that they update their weights via the rule:

$$\omega_{i,j,l}(t) = \Delta\omega_{i,j,l}(t) + \omega_{i,j,l}(t-\Delta(t))$$

The weights of the synapses are preferably updated after the errors have propagated to the following layer, but it is also possible to reverse the order of these two actions.

In one variant embodiment, the variable $x_{j,l-1}$ is stored in a memory MEM_X accessible to the neurons of two consecutive layers, as shown in FIG. 5.

Figure 5A:
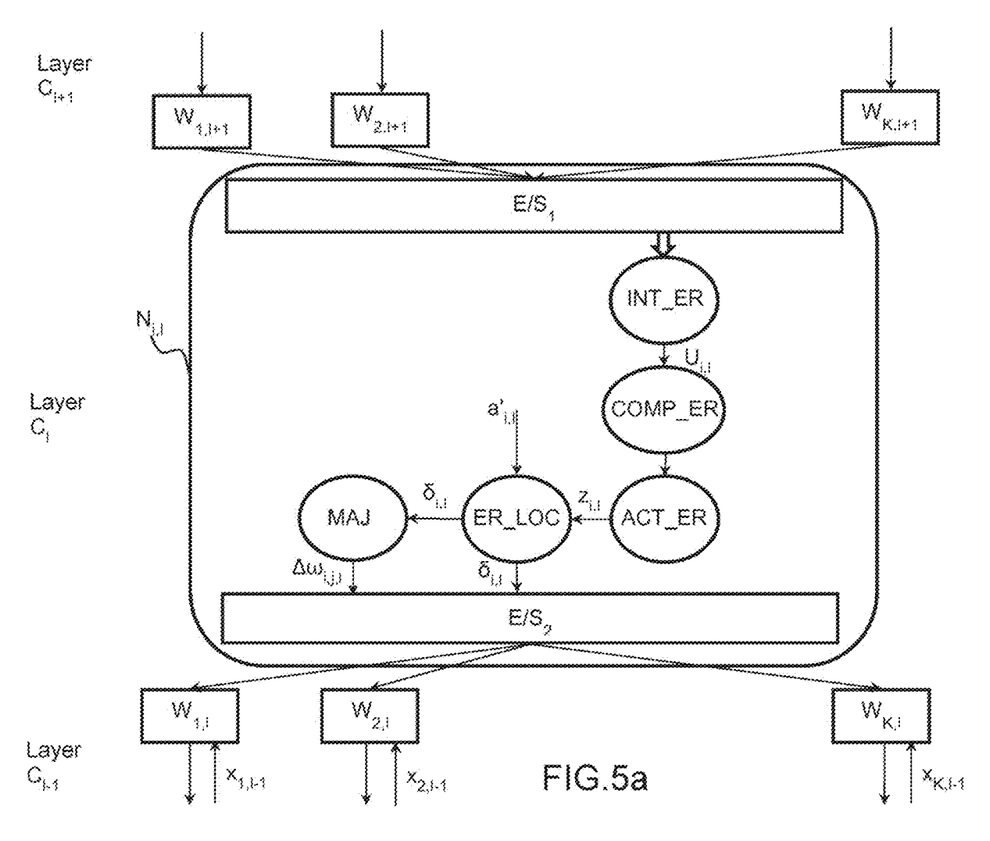
FIG. 5a shows a diagram of one variant of the first embodiment.

In another variant embodiment shown in FIG. 5a, the module MAJ for calculating an update for the weights of the synapses is removed and the synaptic weights are updated directly by the memristive devices that form the synapses. In this variant, the error signals $\delta_{i,l}(t)$ are propagated from the neurons of the layer $C_l$ to the synapses $W_{1,l}, W_{2,l}, \ldots W_{K,l}$, and the variables are propagated in the form of signals from the neurons of the layer $C_{l-1}$ to the synapses $W_{1,l}, W_{2,l}, \ldots W_{K,l}$. Each synapse then updates its synaptic weight based directly on the interaction of the two signals $\delta_{i,l}(t)$ and $x_{j,l-1}(t)$ by analyzing the difference in the potentials of the two signals in order to update its weight with a value representative of the term $\Delta\omega_{i,j,l}(t)$.

Figure 6:
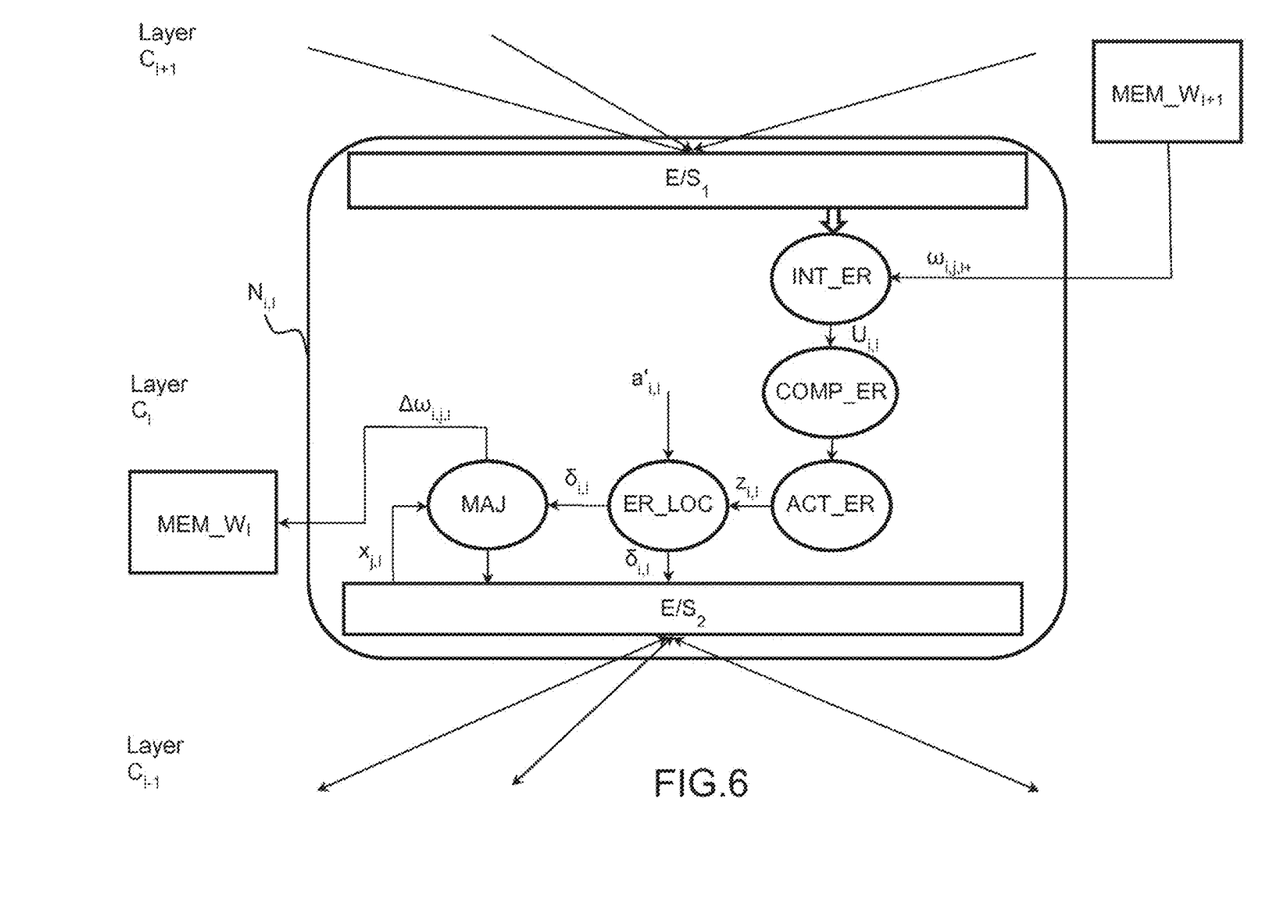
FIG. 6 shows a diagram of a spiking artificial neuron according to the second embodiment of the invention, carrying out a second error back-propagation phase of a training mechanism.

FIG. 6 describes the operation of a spiking neuron $N_{i,l}$ of an intermediate layer $C_l$ during the back-propagation phase according to the second embodiment of the invention described in FIG. 3.

According to this second embodiment, the neuron is implemented by a digital device. The binary or ternary error signals are encoded by binary or ternary digital signals and are transmitted between the neurons via the same communication infrastructure as for the signals propagated during the data propagation phase. The weights of the synapses are stored in a digital memory MEM_$W_{l+1}$,MEM_$W_l$. The integration module INT_ER is modified so as to calculate the sum of the received signals weighted by the weights of the synapses that are read from the memory MEM_$W_{l+1}$ storing the weights of the synapses of the layer In other words, the weighting of the signals by the weights of the synapses is carried out by the neuron, and not by the synapses as in the first embodiment. The memory MEM_$W_l$ of the layer $C_l$ is updated directly by the module MAJ for calculating updates for the weights of the synapses. Various architectures are possible for storing the weights of the synapses in memory. FIG. 6 shows a memory MEM_$W_{l+1}$, MEM_$W_l$ associated with each layer $C_{l+1}$, $C_l$ of neurons. However, it is also possible to have a single shared memory for at least two successive layers of neurons or for the entire neural network. On the other hand, a memory local to each neuron may also be contemplated. The integration module INT_ER is configured so as to access, in read mode, the memory in which the weights of the synapses of the previous layer $C_{l+1}$ have been stored.

In the case of implementation through a digital device as described in FIG. 6, the signals exchanged between the neurons may be implemented by two separate buses. A first data bus is used to transmit the generated spikes via a value 1, in the case of binary signals, or a value 1 or −1, in the case of ternary signals. A second asynchronous signaling bus is used to signal the reception (or transmission) of a datum to a neuron. In other words, the second asynchronous bus is used to transmit the information about the presence of a value other than 0 on the data bus. The second asynchronous bus may be for example an AER "Address Event Representation" bus. One advantage of this implementation is that of preventing the neurons from performing processing operations on received values corresponding to a "0" state. The assembly formed by the data bus and the asynchronous bus is capable of transmitting a binary digital signal or a ternary digital signal. In the case of the binary signal, the reader will understand that the value "1" is indicated by the data bus and the value "0" is indicated by the asynchronous bus. In the case of the ternary signal, the values "1" and "−1" are indicated by the data bus and the value "0" is indicated by the asynchronous bus.

The invention has the advantage of using a binary or ternary representation of the local errors calculated in the error back-propagation phase, such that no floating-point number multiplication is necessary to implement the error calculations. Moreover, the same communication infrastructure may be used both to propagate the data and to back-propagate the errors, since the two types of signal are encoded in the same way. Some calculation modules and operators may be used jointly for the data propagation phase and for the error back-propagation phase. For example, the integration modules INT, INT_ER, the comparators COMP, COMP_ER and the activation modules ACT, ACT_ER may be formed by a single component. Generally speaking, the invention makes it possible to use the same type of device or circuit to carry out the data propagation phase and the error back-propagation phase, since the signals propagated in the two phases are of similar nature and the processing operations applied to these signals are limited to accumulations and comparisons for the two phases.

Generally speaking, the invention may be implemented using hardware and/or software components. The software elements may be present in the form of a computer program product on a computer-readable medium, which medium may be electronic, magnetic, optical or electromagnetic. The hardware elements may be present, in full or in part, notably in the form of dedicated integrated circuits (ASICs) and/or configurable integrated circuits (FPGAs) and/or in the form of neural circuits according to the invention or in the form of a digital signal processor DSP and/or in the form of a graphics processor GPU, and/or in the form of a microcontroller and/or in the form of a general-purpose processor, for example.

More precisely, the neural network according to the invention may be implemented by one or more digital device(s) comprising at least one digital memory and a communication infrastructure for propagating binary or ternary signals between the neurons.

The neural network according to the invention may also be implemented by one or more analog device(s) comprising at least one memristive device and a communication infrastructure capable of propagating analog signals in the form of signed or unsigned spikes.

The synapses may be produced in the form of memristive devices or memristors, for example PCM (Phase-Change Memory) devices or RAM or OXRAM memories or any other device or equivalent analog circuit. A synapse may notably be implemented by an analog circuit based on at least one capacitance or at least one capacitor and for which charging the capacitance or the capacitor makes it possible to store the value of a synaptic weight.

REFERENCES

[1] "Algorithm and hardware design of discrete-time spiking neural networks based on back propagation with binary activations", S. Yin et al, 2017 IEEE Biomedical Circuits and Systems,

[2] "Hardware efficient on line learning through pipelined truncated error back-propagation in binary state networks", H. Mostafa et al, Frontiers in Neuroscience, 2017

The invention claimed is:

1. A spiking artificial neuron ($N_{i,l}$), implemented by a calculating device, the neuron being intended to be integrated within a neural network comprising multiple successive layers ($C_{l-1}$, $C_l$, $C_{l+1}$), each layer being formed of multiple neurons, the neural network being configured so as to execute a training mechanism comprising a first phase of propagating data from an input layer to an output layer, and a second phase of back-propagating errors from the output layer to the input layer, the spiking artificial neuron ($N_{i,l}$) comprising, in order to execute the second back-propagation phase:

a first input/output interface (E/$S_1$) capable of receiving binary or ternary error signals weighted by synaptic coefficients, an error calculation module (ER_LOC) configured so as to calculate a binary or ternary local error signal ($\delta_{i,l}$) from a binary or ternary intermediate signal ($Z_{i,l}$) generated by the neuron in response to the received error signals and from an estimate ($a'_{i,l}$) of the derivative of an equivalent activation function (FAE) implemented by the neuron ($N_{i,l}$) during the first data propagation phase, a second input/output interface (E/$S_2$) capable of propagating the binary or ternary local error signal ($\delta_{i,l}$) to multiple synapses in the form of spikes.

2. The spiking artificial neuron ($N_{i,l}$) as claimed in claim 1, wherein the first input/output interface ($E/S_1$) is capable of transmitting binary or ternary signals to multiple synapses in the form of spikes during the first data propagation phase, and the second input/output interface ($E/S_2$) is capable of receiving binary or ternary signals weighted by synaptic coefficients during the first data propagation phase.

3. The spiking artificial neuron as claimed in claim 1, comprising:
   an integration module (INT_ER) for integrating said error signals in order to calculate a cumulative error ($U_{i,l}$),
   at least one comparator (COMP_ER) for comparing the cumulative error ($U_{i,l}$) with at least one activation threshold from among a positive activation threshold and a negative activation threshold,
   an activation module (ACT_ER) configured so as to generate the binary or ternary intermediate signal ($Z_{i,l}$) on the basis of the result from the at least one comparator.

4. A spiking artificial neuron ($N_{i,l}$), implemented by a calculating device, the neuron being intended to be integrated within a neural network comprising multiple successive layers ($C_{l-1}$, $C_l$, $C_{l+1}$), each layer being formed of multiple neurons, the neural network being configured so as to execute a training mechanism comprising a first phase of propagating data from an input layer to an output layer, and a second phase of back-propagating errors from the output layer to the input layer, the spiking artificial neuron ($N_{i,l}$) comprising, in order to execute the second back-propagation phase:
   a first input/output interface ($E/S_1$) capable of receiving binary or ternary error signals,
   an error calculation module (ER_LOC) configured so as to calculate a binary or ternary local error signal ($\delta_{i,l}$) from a binary or ternary intermediate signal ($Z_{i,l}$) generated by the neuron in response to the received error signals and from an estimate ($a'_{i,l}$) of the derivative of an equivalent activation function (FAE) implemented by the neuron ($N_{i,l}$) during the first data propagation phase,
   a second input/output interface ($E/S_2$) capable of propagating the binary or ternary local error signal ($\delta_{i,l}$) to the neurons of the following layer ($C_{l-1}$).

5. The spiking artificial neuron ($N_{i,l}$) as claimed in claim 4, wherein the first input/output interface ($E/S_1$) is capable of transmitting binary or ternary signals to the neurons of the following layer ($C_{l+1}$) during the first data propagation phase, and the second input/output interface ($E/S_2$) is capable of receiving binary or ternary signals during the first data propagation phase.

6. The spiking artificial neuron as claimed in claim 4, comprising:
   an integration module (INT_ER) for integrating said binary or ternary error signals in order to calculate a cumulative error weighted by synaptic coefficients ($U_{i,l}$),
   at least one comparator (COMP_ER) for comparing the cumulative error ($U_{i,l}$) with at least one activation threshold from among a positive activation threshold and a negative activation threshold,
   an activation module (ACT_ER) configured so as to generate the binary or ternary intermediate signal ($Z_{i,l}$) on the basis of the result from the at least one comparator.

7. The spiking artificial neuron ($N_{i,l}$) as claimed in claim 3, wherein the activation module (ACT_ER) is configured so as to generate a positive intermediate signal when the cumulative error is greater than the positive activation threshold and a negative intermediate signal when the cumulative error is less than the negative activation threshold.

8. The spiking artificial neuron ($N_{i,l}$) as claimed in claim 7, furthermore comprising a subtractor for subtracting the value of the positive activation threshold from the cumulative error ($U_{i,l}$) when a positive intermediate signal is generated, and subtracting the value of the negative activation threshold from the cumulative error ($U_{i,l}$) when a negative intermediate signal is generated.

9. The spiking artificial neuron ($N_{i,l}$) as claimed in claim 1, furthermore comprising a module (MAJ) for calculating an update for synaptic coefficients from the local error ($\delta_{i,l}$) and from a result ($x_{j,l-1}$) of the equivalent activation function (FAE).

10. The spiking artificial neuron ($N_{i,l}$) as claimed in claim 9, wherein the result ($X_{j,l-1}$) of the equivalent activation function (FAE) is calculated during the data propagation phase of a neuron.

11. The spiking artificial neuron ($N_{i,l}$) as claimed in claim 9, wherein the module (MAJ) for calculating an update for synaptic coefficients is activated after the propagation of the local error.

12. The spiking artificial neuron ($N_{i,l}$) as claimed in claim 1, wherein the module (ER_LOC) for calculating a local error signal is configured so as to calculate a product of the intermediate signal ($Z_{i,l}$) and the estimate ($a'_{i,l}$) of the derivative of the equivalent activation function (FAE).

13. The spiking artificial neuron ($N_{i,l}$) as claimed in claim 1, wherein the equivalent activation function (FAE) is a function of integrating the spikes ($S_{i,l}$) generated by the neuron and that is weighted by a learning rate parameter (n) of the neural network.

14. The spiking artificial neuron ($N_{i,l}$) as claimed in claim 1, comprising a derivative calculation module (DER) configured so as to calculate the estimate ($a'_{i,l}$) of the derivative of the equivalent activation function (FAE) from a result of the equivalent activation function (FAE) ($X_{i,l}$) implemented by the neuron ($N_{i,l}$) during the first data propagation phase and from an integration variable ($V_{i,l}$) of the neuron during the first data propagation phase.

15. The spiking artificial neuron ($N_{i,l}$) as claimed in claim 14, wherein the estimate ($a'_{i,l}$) of the derivative of the equivalent activation function (FAE) is equal to 1 when the result ($X_{i,l}$) of said function is strictly positive or the integration variable ($V_{i,l}$) is strictly positive, and is equal to 0 if not.

16. The spiking artificial neuron (Ni) as claimed in claim 1, wherein the derivative calculation module (DER) is activated during the data propagation phase of the neuron or during the error back-propagation phase of the neuron.

17. A spiking artificial neural network configured so as to execute a training mechanism comprising a first phase of propagating data from an input layer to an output layer, and a second phase of back-propagating errors from the output layer to the input layer, the neural network comprising multiple layers of spiking artificial neurons as claimed in claim 1, each neuron being connected at least to a neuron of a following layer or to a neuron of a previous layer via a synapse.

18. The spiking artificial neural network as claimed in claim 17, the network comprising an input layer and an output layer, the neurons of the input layer being configured so as to receive data to be propagated in binary or ternary form, and the neurons of the output layer being configured so as to calculate an error between an obtained result and a target result from the data propagated during the first data propagation phase.

19. The spiking artificial neural network as claimed in claim 18, wherein each neuron of the output layer comprises an encoder (COD) configured so as to encode the error into a set of at least one binary or ternary signal.

20. The spiking artificial neural network as claimed in claim 19, wherein the encoder (COD) is configured so as to quantize the error on two or three quantization levels so as to generate a binary or ternary signal.

21. The spiking artificial neural network as claimed in claim 19, wherein the encoder (COD) is configured so as to encode the error through a group of successive binary signals or a group of successive ternary signals.

22. A spiking artificial neural network configured so as to execute a training mechanism comprising a first phase of propagating data from an input layer to an output layer, and a second phase of back-propagating errors from the output layer to the input layer, the neural network comprising multiple layers of spiking artificial neurons as claimed in claim 4, each neuron being connected at least to a neuron of a following layer or to a neuron of a previous layer via a synapse having a synaptic weight, the synapses ($W_{1,l}, \ldots, W_{K,l+1}$) being implemented in the form of digital memories, memristive devices or analog circuits.

23. The spiking artificial neural network as claimed in claim 22, wherein each synapse is configured so as to update its synaptic weight in response to a binary or ternary error signal ($\delta_{i,l}$) received from a neuron of a following layer ($C_l$) and to a signal representative of the result ($X_{j,l-1}$) of the equivalent activation function (FAE) received from a neuron of a previous layer ($C_{l-l}$).

* * * * *

UNITED STATES PATENT AND TRADEMARK OFFICE
CERTIFICATE OF CORRECTION

| | | |
|---|---|---|
| PATENT NO. | : 12,147,902 B2 | Page 1 of 1 |
| APPLICATION NO. | : 17/287277 | |
| DATED | : November 19, 2024 | |
| INVENTOR(S) | : Johannes Thiele et al. | |

It is certified that error appears in the above-identified patent and that said Letters Patent is hereby corrected as shown below:

In the Claims

In Claim 13, Column 16, Line 32, "learning rate parameter (n)" should be -- learning rate parameter ($\eta_l$) --.

Signed and Sealed this
Eleventh Day of February, 2025

Coke Morgan Stewart
*Acting Director of the United States Patent and Trademark Office*